Feb. 18, 1958     C. A. GRASSWICK     2,823,510
WINDROWER HAVING STALK BENDING MEANS

Filed Sept. 8, 1953     3 Sheets-Sheet 1

INVENTOR.
CARL A. GRASSWICK
BY
ATTORNEYS

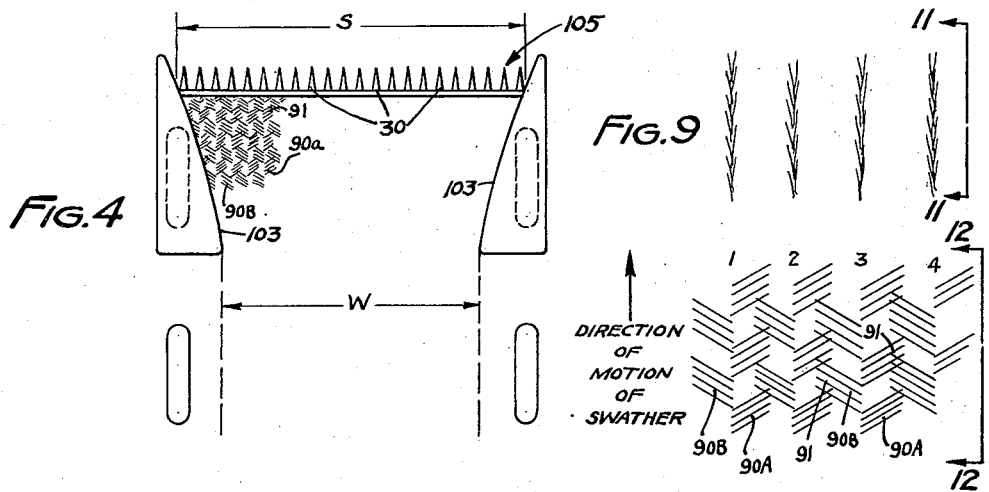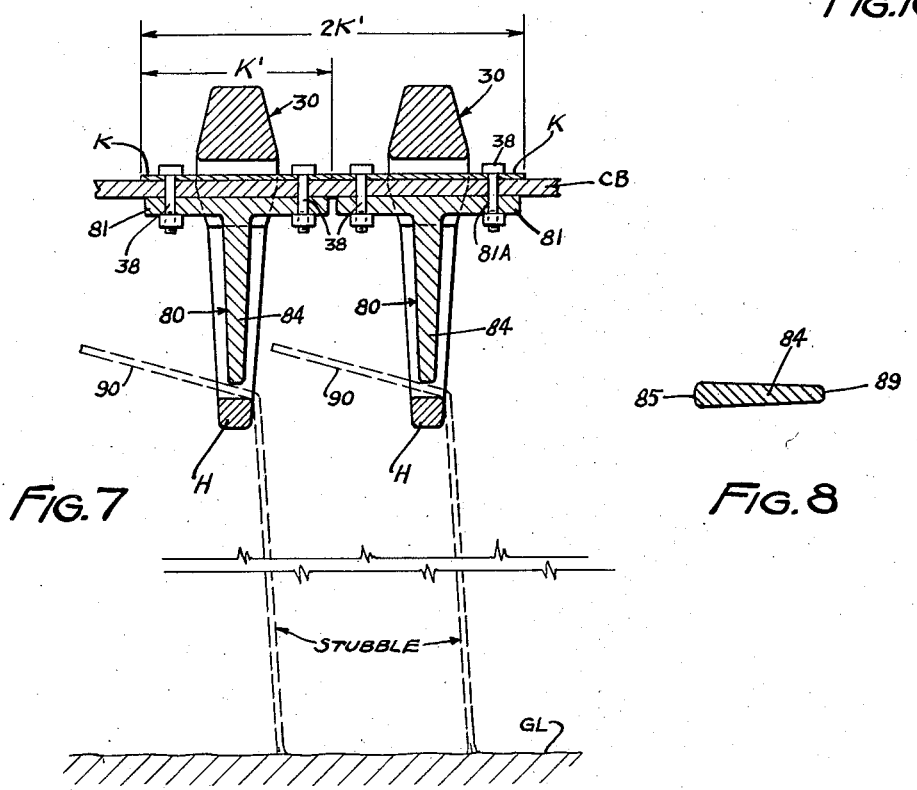

Feb. 18, 1958   C. A. GRASSWICK   2,823,510
WINDROWER HAVING STALK BENDING MEANS
Filed Sept. 8, 1953   3 Sheets-Sheet 3
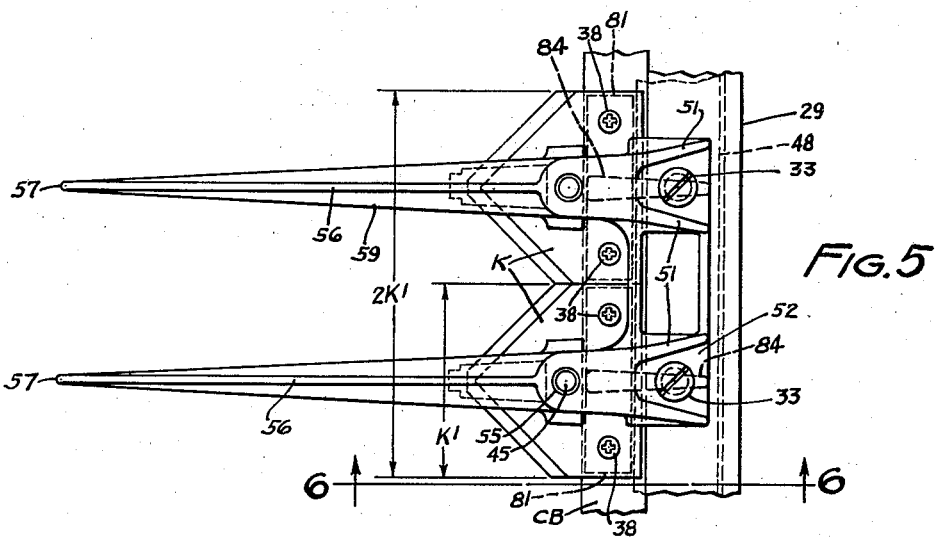
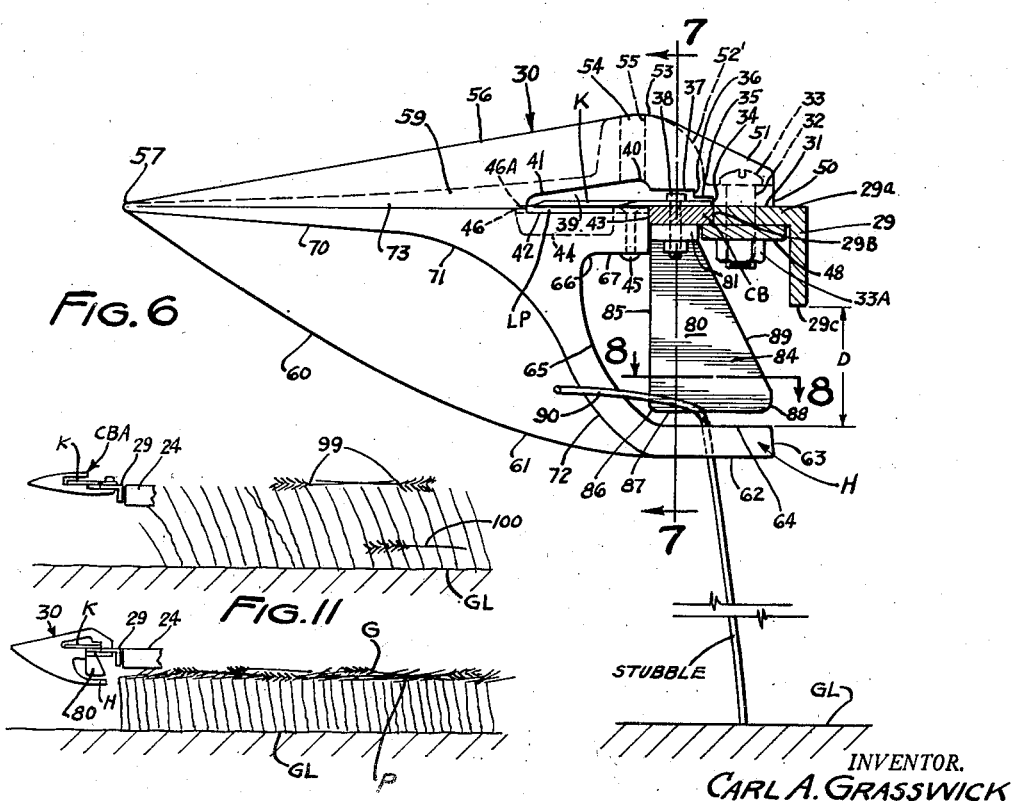
INVENTOR.
CARL A. GRASSWICK
BY
ATTORNEYS United States Patent Office 2,823,510
Patented Feb. 18, 1958

2,823,510

WINDROWER HAVING STALK BENDING MEANS

Carl A. Grasswick, Valley City, N. Dak.

Application September 8, 1953, Serial No. 378,761

17 Claims. (Cl. 56—192)

This invention relates to improvements in harvesting equipment, particularly "swathers," "windrowers" and similar machines that are used to cut field grains in the harvesting operation. The preferred practice for the harvesting of field grains is to cut the grain when it has reached a certain stage of maturity and window the thus cut grain. The windrows are permitted to lay for a time period ranging from a few days to several days after which a pick-up combine passes through the field, elevates the windrows and threshes the grain, depositing the residual straw upon the field.

This method of harvesting is much preferred over the use of a once-over combining operation, for in the latter type of operation the grain is cut and passed directly through the threshing mechanism of the combine and the straw deposited. In this latter, once-over type of combining operation, some of the grain in the field may be immature and other grain over-mature, with the result that there is excessive loss due to shaking out of the over-mature grain and loss due to heating of the immature grain. Hence, the advantage of the cutting and windrowing lies in the fact that the grain is cut at an average state of maturity sufficient for the production of sound kernels of grain and is then permitted to lay in windrows until it all reaches a stage of average satisfactory moisture content. Some of the advantages of the windrowing operation are, however, lost due to the fact that the cut heads of the grain with the portion of attached straw which is deposited in the windrow tends to fall down between the stubble of the windrow and reaches ground level. When this happens the grain on the ground does not dry out properly and is not picked up properly by the pick-up cylinders of the combine. Hence, losses appear in the windrowing operation. These losses tend to increase when heavy windrows are attempted to be deposited upon the stubble for when the windrow is sufficiently heavy it tends to mat the stubble down and the windrow is not held above ground level, as is desired, but reaches ground level more or less and does not have the advantage of drainage and quick-drying during showery weather.

It is an object of the present invention to provide an improved mechanism for the harvesting of grain that is cut and placed in a windrow.

It is a further object of the invention to provide an improved harvesting machine wherein the stubble is bent sharply above ground level and in diverse directions so as to form an elevated "platform" upon which the windrow of cut grain may be deposited safely and held above ground level for quick drying, aeration and protective during showery weather.

It is another object of the invention to provide an improved harvesting machine wherein the entire width of the cut grain is deposited upon the stubble, the latter being bent as aforesaid by the machine in a pattern so as to support the cut grain on a "platform" of bent stubble.

It is another object of the invention to provide an improved harvesting machine wherein means is provided for bending the stubble so as to make a platform on which the cut grain may be deposited.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated with reference to the drawings, in which corresponding numerals refer to the same parts, and in which—

Figure 4 is a simplified schematic plan view of an improved harvesting machine according to the present invention;

Figure 5 is a plan view on an enlarged scale of the improved cutting and stubble bending mechanism of the present invention;

Figure 6 is an enlarged sectional view taken along the line and in the direction of arrows 6—6 of Figure 5, showing the improved grain cutting and stubble-bending mechanism of the present invention;

Figure 7 is an enlarged fragmentary vertical sectional view, taken along the line and in the direction of arrows 7—7 of Figure 6;

Figure 8 is an enlarged sectional view taken along the line and in the direction of arrows 8—8 of Figure 6;

Figures 9 and 10 are plan views of sections of the earth's surface of a field where the grain has been cut, and the stubble bent over. Figure 9 is a view of the way the stubble is bent or inclined all in one direction by the customary swather, Figure 10 being an idealized view of the way the stubble is bent sharply in diverse directions back and forth transversely of the direction of cutting by the improved swather of the present invention;

Figures 11 and 12 are sectional views taken along the lines of arrows 11—11 of Figure 9 and arrows 12—12 of Figure 10, respectively.

The improvements of the present invention are adaptable to agricultural implements known as "swathers" or "windrowers," for that operation which is known generally as "windrowing." In such an operation the grain is cut by a sickle bar assembly, which may be carried at a level ranging usually from about 4 to as much as 14 or more inches above the ground, and the cut portion of the stem of the grain, together with the head is then moved backwardly by a "reel," which is a part of the machine, and onto, usually, a conveyor belt or "apron" which has a length and is driven so as to carry that portion of the cut grain which is not in the windrow, toward a segment of the cutting swath where it is deposited along with other grain that is cut in that segment so as to form a windrow. These machines are of many types and are manufactured by various companies in the agricultural implement business. Some are tractor-drawn and driven by ground wheel drives. Others are tractor-drawn and driven by a power take-off on the tractor. In still other instances the windrower may be self-propelled. In almost all instances it has been the practice to use a movable apron for part of the width of the windrow so as to carry part of the grain towards the windrow and thus narrow it. According to my invention, I contemplate that the apron may be dispensed with on narrow windrowers and the cut grain guided in slightly by chutes or guide boards so as to narrow the swath somewhat, this form being particularly adaptable for comparatively narrow windrowers.

Figure 1:
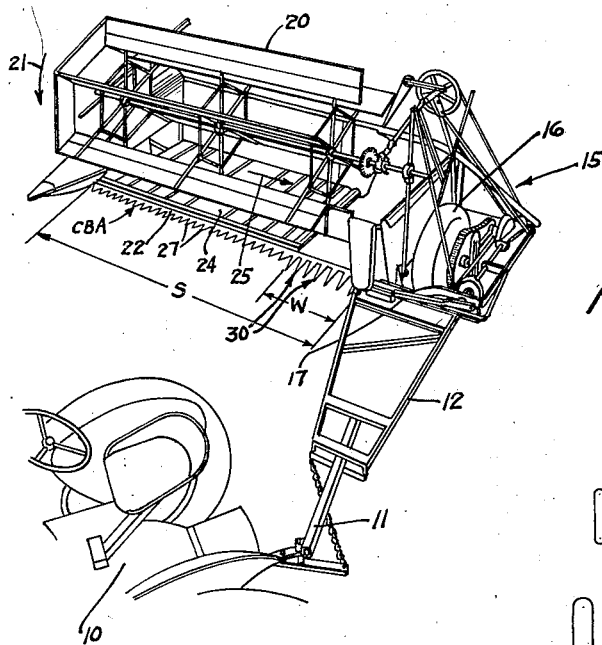
Figure 1 is a perspective view of the rear portion of a tractor pulling a swather having left-hand delivery and equipped according to the present invention.
Figure 2:
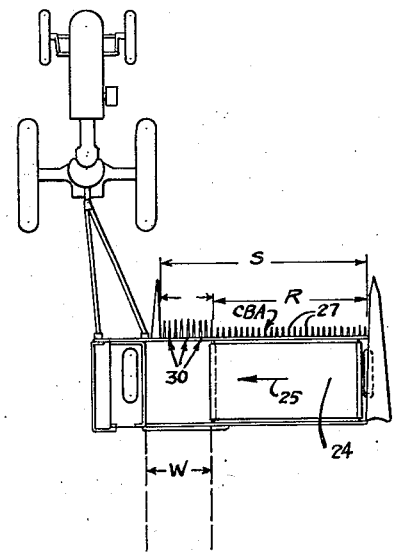
Figure 2 is a schematic and simplified plan view of a tractor and swather equipped according to the present invention.
Figure 3:
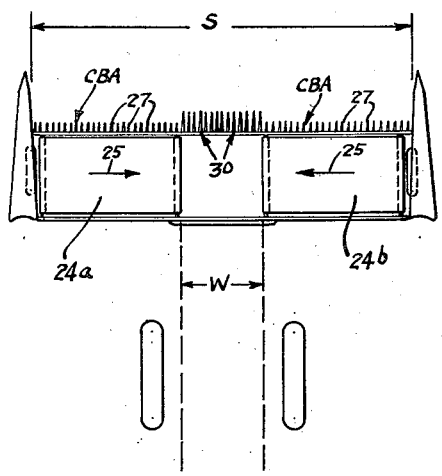
Figure 3 is schematic and simplified plan view of a swather, which may be considered either as tractor-drawn or self-propelled, equipped for center delivery of the windrow, and including the improvements of the instant invention.

By way of illustrating the situation in invention is applicable. There are shown in some of the figures of the drawings several of the conventional types of windrows that are modified in accordance with the present invention. Thus, in Figures 1 and 2 there is illustrated a windrower of the tractor-drawn type in which the cutting mechanisms, the reel and the apron of the windrower are driven from a ground wheel. Thus, in Figure 1 the tractor, a portion of which is shown generally at 10, is connected by a hitch 11 to the drawbar frame 12 of the windrower generally designated 15. The windrower has one or more wheels (of which one wheel 16 is shown) to support the frame 17 of the windrower. The mechanism by which the wheel 16 drives the cutter bar, reel and apron is illustrated in part but will not be specifically described since it is sufficient to state that the reel 20 rotates in the direction of arrow 21 as the machine operates and that the sickle bar 22, which cuts a swath of width S is likewise driven so as to cut the grain. One form of means by which the cutter bar is driven reciprocably from the wheels is shown and described in U. S. Patent No. 1,968,683 issued to E. O. Hanson on July 31, 1934. A portion of this swath of width W is, in this machine, the width of the windrow, which is formed by the action of the machine. It will be noted that the reel 20 has a width R and it moves the grain that is cut, back onto an apron 24 which travels in the direction of the arrow 25 due to the mechanism of the machine. The grain falls or is moved by the reel 20 onto the apron 24 and is carried in the direction of arrow 25 and is deposited along with the grain that is cut in the windrow width W to form the windrow W. This is the standard pattern of a conventional windrower drawn by the tractor. In Figure 3 there is illustrated another form of standard windrower where the cutting width of the swath is S. Here the windrow is of width W and is at approximately the center of the machine, there being two aprons 24A and 24B moving in the direction of the arrows shown so as to deposit the grain that falls upon them in the windrow along with the grain that is cut in the center portion of the windrow W. The machine of Figure 3 may be of the self-propelled type or may be tractor drawn.

According to the present invention the usual cutter sections 27 of the cutter bar assembly generally designated CBA are of the customary type that constitute a part of the standard machine. However, those sections generally designated 30 in that portion of the machine wherein the windrow is formed are of a modified type of the present invention now to be described. These modified cutter sections are shown in Figures 5, 6, 7 and 8 of the drawings. The sections generally designated 30 are made so as to mount upon the angle bar frame member 29 which is a part of the usual windrower cutter bar assembly. The sections shown in Figure 5 are cast integrally as a pair. The usual cutter bar teeth are mounted on the flat upper flange 29A of the angle bar 29 by means of bolts through appropriately spaced holes. The modified cutter section is likewise so mounted, being provided with a machined flat bolting surface at 31 having an aperture 32 through which the mounting bolt 33 is adapted to pass. From the flat section the bar reaches upwardly along the surface 34 (which is machined) and thence horizontally forwardly along the surface 35. The bar then rises at 36 and again reaches forwardly at 37 so as to clear the rivets or bolts 38 that are used to attach the standard cutter knives K to the cutter bar CB. The opening 39 is enlarged slightly at 40 and then tapers down at 41, and returns along the surface 42 to the vertical surface 43 which is also machined. A hollowed out space is generally provided at 44 so as to lighten the weight of the casting and a flat steel plate, known as a ledger plate, is provided at LP and is held in place by the rivet 45. The ledger plate is of standard design and has a forwardly extending tip 46 which holds its front end in an appropriately shaped notch 46A in the casting 30. The front surface 29B of the angle 29 is smooth and the back vertical surface of the cutter bar CB works against it. The surface 43 of the improved cutter section casting 30 is likewise machined smooth and defines a space slightly in excess of the width of the standard cutter bar CB and in which that bar operates. In order to support the back edge of the cutter bar there is provided a plate 48 which extends slightly under the back edge of the cutter bar CB as shown in Figure 6, the plate being held in place by the nut 33A on the bolt 33. The front portion of the cutter bar is supported by virtue of the fact that the knives K that are attached to the cutter bar slide back and forth on the ledger plates LP with which they cooperate to produce a cutting action. The cutter bar and knives are held down by standard clips, not shown, that are attached per usual practice between the sections.

The casting 30 thus is provided with a space for receiving the usual cutter bar CB, and knife K and for supporting the ledger plate LP, all in usual spaced relation so as to produce a cutting action.

However, the improved cutter sections of the present invention are otherwise modified. Beginning at the surface 31 by which the section is attached to the angle 29 the outer outline of the casting proceeds upwardly at 50 and thence forwardly and upwardly at 51. The casting is hollowed out in the space 52 as to provide a flat surface for the head of the screw 33, and the edges 51 are thus stiffening webs which extend up and blend into the curved surface 52' in the region 53. The casting bulks in the area 54 and is provided with a vertical aperture at 55 by means of which access may be had to the rivet 45 for setting that rivet. The portion 56 extends forwardly to the point 57, but this is a narrow stiffening flange, the casting being of the full width only at the level 59, the narrow tapered shape being shown in Figures 5 and 6. The casting then extends downwardly and rearwardly along the line 60, which blends through the curve 61 to a horizontal surface 62 terminating at a more or less vertical edge 63. The casting then extends forwardly at 64 and upwardly and forwardly along the curved line 65 until it blends at 66 into the horizontal portion 67 which joins the machined vertical face 43. The maximum horizontal thickness of the casting is confined to those portions which in side elevation appear within the area defined by lines 43, 73, point 57 and lines 70, 71, 72, 62, 63, 64, 65, 66, 67 and return to 43. This shape accordingly forms a central stiffening portion of the casting which tapers to a point in the front and provides a horn shape generally designated H at the lower rearward extremity between the lines 65—64 and the lines 72—62. This horn H terminates at the rear surface 63. There is accordingly left a free space indicated by the dimension D between the horn H and the lower flange 29C of the supporting angle bar of the cutter bar assembly.

Below the cutter knives K—K, or below at least some of them, there are mounted bender fins generally designated 80. These fins are preferably made as unitary castings having an upper horizontal support plate 81 (machined on its upper surface) and a central downwardly extending fin portion 84 defined by the vertical line 85, corner 86, lower horizontal line 87, corner 88 and the slanting return line 89. Each fin 84 is tapered in thickness from the front surface 85 to the rear surface 89 as shown generally in Figure 8, and is tapered from top to bottom, as shown in Figure 7. The width of the fin at its upper end (side elevational view, Figure 6) is equal to the width of the supporting bar 81, but along the lower line 87 the width is such that the corner 88 terminates approximately at the place that the back surface 63 of the horn also terminates. The upper support bar 81 of the fin is made just a little bit less in width than the cutter bar CB so as to provide a narrow space at the rear portion of the cutter bar against which the upper surface of the bar 48 may push for supporting the cutter bar at the back end. Likewise the length in the direction of the cutter bar of the plates 81 is made slightly less than the width of the cutter knife K along the cutter bar. This eliminates the necessity of machining the end surfaces of the plate 81, and these units 80 may, therefore, be simply sand castings with only one machined surface, viz., the upper surface of the plate 81. The plate 81 is also apertured at 81A so as to receive the usual fastening rivets which pass through the cutter knives K of the cutter bar CB. Since assembly may frequently be made under less than ideal shop conditions or in the field, I prefer that the cutter knives K used in connection with the special sections herein illustrated be held on by bolts rather than rivets. A hardened Allen head bolt 38 of appropriate size and self-locking cap screws, serve very well.

In the usual swather the cutter bar CB and the knives mounted thereon reciprocate back and forth through a distance equal to approximately twice the width K' of the knives K. Accordingly, as shown in Figures 5 and 7, the distance of reciprocation of the cutter bar and knives is equal to 2K'. Since the benders 80 move with the cutter bar, these likewise reciprocate back and forth with an amplitude of reciprocations equal to 2K' and in so doing each bender 80 moves from adjacent the horn H of one of the sections 30, past the horn H of the next adjacent section to a position in line with the horn H of the second adjacent fins. Then the motion is reversed. The grain is cut at the level of the lower surface of the knives K, and since the stubble then drags back along the sides of the horn H it soon reaches a position as shown in Figures 6 and 7 where the upper portions 90 of the stubble are in a position such that the sidewise reciprocating movement of the benders 80 will bend the stubble rather sharply across the rearwardly extending horns H. Since the cutter bar and bender plates 84 reciprocate back and forth as the entire windrower machine moves forward generally, the bending action lays the bent portion 90 of the stubble in a more or less diagonal path which is determined by the speed of reciprocation of the cutter bar relative to the speed of the implement in the forward direction. The bending of the upper ends 90 of the stubble is accomplished first in one direction and then the other, as shown in the idealized pattern of Figure 10. In this figure there are rows 1, 2, 3 and 4 along which the grain grows, it having been drilled in during the seeding arrangement in generally parallel rows. The portions 90A of the stubble are bent to the right in each row, whereas the portions 90B are bent to the left. There is, of course, some overlapping as at 91—91, but in general the upper portions of the straw are bent and drawn slightly forwardly so as to form a "platform" composed of the bent-over tops 90 of the stubble. This "platform" is a certain distance above the ground, depending upon the setting of the general level of the cutter bar assembly during the swathing operation. This platform generally designated P in Figure 12 holds the cut grain G in an elevated position and largely prevents it from falling down on the ground level GL as happens frequently, as shown in Figure 11.

It is not intended by Figure 10 to imply that the swather must be operated along the same direction as the grain was drilled during seeding. The swather can be operated equally well across the drilled rows of grains, for the grain is then simply "gathered" into "rows" at least at the level of cutting of the grain. The dividing action of the sections of the cutter bar assembly do this. The thus gathered "rows" are then bent at level 90 to form a platform in much the same way as though the grain had originally been cut in the direction it was harvested.

Figures 9 and 11 are a much simplified illustration of what happens in the usual swathing operation. In this operation the cutter bar assembly CBA, Figure 11, includes the angle 29 as previously described and the angle bends the stubble over as the swather proceeds forwardly. The swather is held down until the grain is piled onto it, and some of the grain stays on top as at 99, but at least some of the stalks of the grain (frequently a goodly percentage) may fall through the spaces (as shown in Figure 9) between the bent-over rows of stubble and to ground level, as shown at 100 in Figure 11. Therefore, a certain percentage of the grain, particularly in heavy windrows, falls to the ground and either fails to dry satisfactorily and is thus damaged and lowered in grade, or may never even be picked up by the pick-up of the combine during the subsequent harvesting operation. By use of the instant invention much of this falling-through of the cut grain is prevented.

Referring to Figure 4 there is shown a windrower of a relatively narrow type which may be used for smaller farming operations. It is of a width such as 7 to 9 feet, as contrasted with windrowers of 15 to 24 feet used in the tremendous grain operations of our western states. In this narrower windrower the full cutting width of the swath at S is provided with the improved cutter sections of Figures 5, 6, 7 and 8, of the present invention. The windrower is provided with guide boards at 103—103 slanting inwardly and the grain falls backward over the cutter bar assembly into a somewhat narrowed thin windrow W which is spread out thinly on top of the bent-over portions 90A and 90B of the stubble. A sufficiently wide (8 foot) pick-up is then used on the combine to pick up this wider type windrow.

Heretofore it was thought advantageous to produce a narrow windrow. It was thought that the apron of the windrower would produce a sufficient random lay of the straw so as to prevent most of the falling-through of the cut grain as it is pushed by the apron into a windrow. However, this is not entirely the case. The disadvantage of the narrow windrow is that due to the greater weight per unit of area of the windrow, the stubble is more readily bent over and consequently the grain may sink to ground level and damage to the grain has many times occurred due to concentration of too much weight on the stubble of the windrow. Furthermore, as the windrow is made heavier and heavier, circulation of air through it for drying during showery weather is largely impeded and windrows may remain soggy and wet, particularly if the weather is generally rainy. By providing a wide relatively thin windrow, as in Figure 4, a very light and open lay of the cut grain is allowed which assists materially in the drying of the grain even during unsatisfactory harvesting weather. Throughout the entire width of the cutter bar assembly of Figure 4, there are provided the improved cutter section assemblies 30, as shown in Figures 5, 6 and 7. Hence a platform of bent-over straw stubble is provided throughout the entire width, and the cut grain is laid thinly over the area. For windrowers up to eight or even nine feet for the width S, the width of the windrow W may thus be reduced to as much as 5½ to 7½ feet and by use of a pick-up of appropriate width, very satisfactory results during the harvesting operations may be obtained.

As many apparently widely different embodiments of this invention may be made without departing from the spirit and scope thereof, it is to be understood that I do not limit myself to the specific embodiments herein.

What I claim is:

1. In a grain harvesting swather having a mobile frame and a cutter assembly composed of a cutter bar frame extending transversely of the direction of motion of the mobile frame, a plurality of standard cutter sections in spaced relation thereon and a reciprocable cutter bar having a plurality of cutter knives thereon, the improvement comprising forming at least some of said cutter sections with a bender horn extending downwardly and rearwardly below the cutter knives so as to form a vertical space between the cutter knives and said horn and bender means attached to the cutter bar so as to be reciprocable therewith, said bender means extending downwardly from the cutter bar into proximity to said horn for bending the cut stubble over said horn as the cutter bar and the knives and bender means thereon reciprocate and move with the mobile frame.

2. The apparatus of claim 1 further characterized in that substantially all of the cutter sections extending across the cutting width of the cutter bar assembly include bender horns and bender means provided below said cutter knives on said bar for bending the stubble thereover.

3. The apparatus of claim 1 further characterized in that the swather has a movable delivery apron behind the cutter assembly for delivering to a windrow width, and said cutter assembly is equipped with cutter sections having bender horns throughout substantially that portion of the cutter assembly that corresponds to said windrow.

4. The apparatus of claim 1 further characterized in that said cutter sections that have bender horns thereon are also made to extend farther in the direction of cutting motion than said standard sections.

5. The apparatus of claim 1 further characterized in that said cutter sections that have the bender horns are attached to their rear portion to said cutter bar assembly frame and are shaped so as to extend upwardly and forwardly and thence downwardly and rearwardly and terminate at said horn, extending rearwardly and generally below the cutter bar and cutter knives, the most forwardly extending portion thereof being in advance of the forward tips of standard cutter sections.

6. In a swather for cutting field grains, which swather has a mobile frame and a cutter bar assembly extending transversely of the direction of motion of the mobile frame, said cutter bar assembly comprises a cutter bar frame, a plurality of standard cutter sections in spaced relation thereon and a reciprocating cutter bar having a plurality of cutter knives thereon, the swather also including means for reciprocating said cutter bar and knives relative to the cutter sections and a movable apron extending transversely of the direction of motion of the swather throughout a portion of the transverse length of said cutter bar for carrying the cut grain and depositing it in a windrow portion of said cutter bar, the improvement comprising forming each of those cutter sections within the windrow portion of said swather with a horn extending downwardly and in spaced relation below the cutter knives so as to form a vertical space between the cutter knives and said horn, and bender means attached to the cutter bar so as to be reciprocable therewith, said bender means extending downwardly from the cutter bar and into proximity to each of said horns for bending cut stubble over said horns as the cutter bar and the knives and bender means thereon reciprocate.

7. The apparatus of claim 6 further characterized in that the swather is of the type having two aprons movable towards a center windrow section and the cutter sections in said windrow section are each formed with a horn extending downwardly and rearwardly below the cutter knives so as to form a vertical space between the cutter knives and said horn, and said bender means is provided and attached to the cutter bar so as to be reciprocable therewith in proximity with the horns of said sections for bending the cut stubble over the bars as the cutter bar and the knives and the bender means thereon reciprocate.

8. An article of manufacture comprising a combined cutter for field grains and bender for the stubble left after the grain is cut comprising a frame bar extending transversely to the direction of cutting, a plurality of sections mounted on said bar, each of said sections including a portion extending forwardly of said bar and a horn extending from said section downwardly and rearwardly in spaced relation below said bar, said sections having a space between the forward edge of said frame bar and said sections defining a transverse opening in which a cutter bar may reciprocate, and also including a transverse aperture therethrough extending forwardly of said space and in which the cutter knives may reciprocate for cutting the grain, a cutter bar extending transversely through said space and means for reciprocating said bar, cutter knives on said cutter bar, means attached to the frame bar for supporting the cutter bar and bender means attached to the cutter bar and extending downwardly in close proximity to the downwardly and rearwardly horn for reciprocation relative thereto for bending the grain stubble as it is cut.

9. The apparatus of claim 8 further characterized in that two of said sections are formed as an integral unit.

10. The apparatus of claim 8 further characterized in that said bender means comprises a plate attachable to the under surface of the cutter bar, and a blade extending downwardly and rearwardly relative to said plate, said plate having a width slightly less than the transverse width of a standard cutter section and apertured for attachment by bolts passing through the standard cutter section, the cutter bar and said plate.

11. An improved cutter section for cutting grain and bending the resultant grain stubble which comprises a main cutter section casting having a lower flat bolting surface at its rearmost portion, an aperture therethrough for bolting said surface against a supporting frame bar, said casting extending upwardly and forwardly and thence downwardly and rearwardly with reference to said surface, said casting including a transverse surface therethrough for receiving a ledger plate against which a standard sickle cutter bar may rest and a space for the cutter bar and knives attached thereto to pass through, said section also including a horn extending downwardly and rearwardly and terminating below and in spaced relation to the bolting surface and frame bar to which said bolting surface is adapted to be attached.

12. An article of manufacture comprising an improved cutter section casting adapted to be attached to a transverse cutter bar frame and support surface of a swather, said casting including a downwardly facing rearwardly disposed surface for resting on a supporting surface of the swather, said casting having an aperture therethrough for bolting the casting to said supporting surface, the casting then extending forwardly and upwardly and thence to a terminal front point and thence downwardly and rearwardly to a terminal rear horn portion generally below and spaced from the bolting surface, the casting then extending from said portion forwardly and upwardly and thence back so as to form a space between the supporting surface and said horn portion which is open in the direction opposite to the direction of motion, said casting then extending upwardly along a vertical surface which is spaced from the front edge of said bolting surface, and thence forwardly along a horizontal surface forming a ledger plate support surface shaped to receive a ledger plate against which the standard cutter knife of a cutter assembly may reciprocate, the casting then extending slightly upwardly and to the rear and thence to said bolting surface to form a space for the cutter knives and cutter bar.

13. The article of manufacture of claim 12 further characterized in that two of said sections are cast as an integral unit in spaced relation equal to the spacing of the standard cutter knives of a swather.

14. As an article of manufacture an integral unit having an attachment plate of rectangular configuration slightly less in length than the width of a standard cutter knife, and a width slightly less than the width of a standard cutter bar to which said knife is adapted to be attached, said plate having extending from the approximately transverse center line of one of its flat surfaces a blade-like fin oriented approximately normal to the plate and having one edge aligned with one edge of the plate, and another edge angularly joined to said plate, said fin having a maximum width greater than the width of said plate, said plate having apertures therethrough in spaced relation corresponding to the apertures of the standard cutter knife.

15. The article of manufacture of claim 14 further characterized in that said fin is tapered in cross section from a maximum at said one edge to a minimum at said another edge.

16. An article of manufacture comprising a combined harvesting cutter and stubble bender which comprises a frame bar adapted to extend transversely to the direction of cutting, a plurality of sections mounted on said bar, each of said sections including a cutter section casting having a lower flat bolting surface at its rearmost portion and an aperture therethrough for bolting said surface against the frame bar, said casting extending upwardly and forwardly and thence downwardly and rearwardly with reference to said bolting surface, a horn extending downwardly and rearwardly and terminating below and in spaced relation to the bolting surface and frame bar, said frame bar and said sections being positioned with respect to each other so as to provide a space between the forward edge of the frame bar and said sections defining a transverse opening in which a standard sickle cutter bar may reciprocate, a cutter bar extending transversely through said space, means for supporting and reciprocating said bar, said section castings being provided with a further transverse opening forward of the space between said frame bar and said sections for receiving a ledger plate, a ledger plate in said opening, a plurality of knives on said cutter bar extending into said further transverse opening and resting upon said ledger plate, bemder means attached to said cutter bar extending downwardly in close proximity to the downwardly and rearwardly extending horn of the section castings for reciprocation with the cutter bar relative to said horn for bending stubble as it is cut, said bending means comprising an attachment plate, and a blade-like fin extending from the approximate transverse center line of the bottom surface of said plate and oriented approximately normal to said plate with one edge alined with one edge of the plate and the other edge angularly joined to said plate, said fin having a maximum width greater than the width of the plate.

17. The article of claim 16 further characterized in that at least two of said section castings are formed as an integral unit in spaced relation equal to the spacing of the standard sickle cutter bar knives and said bending fin is tapered in cross-section from a maximum at its aligned leading edge to a minimum at said angularly joined trailing edge.

References Cited in the file of this patent
UNITED STATES PATENTS

| | | |
|---|---|---|
| 152,486 | Harder | June 30, 1874 |
| 1,279,809 | Williams | Sept. 24, 1918 |
| 1,374,973 | Witte | Apr. 19, 1921 |
| 1,489,961 | Orth | Apr. 8, 1924 |
| 1,622,299 | Wanamaker | Mar. 29, 1927 |
| 1,726,378 | Barber | Aug. 27, 1929 |
| 1,915,615 | Petsch | June 27, 1933 |

U. S. DEPARTMENT OF COMMERCE
PATENT OFFICE

CERTIFICATE OF CORRECTION

Patent No. 2,823,510     Carl A. Grasswick     February 18, 1958

It is hereby certified that error appears in the printed specification of the above numbered patent requiring correction and that the said Letters Patent should read as corrected below.

Column 1, line 20, for "window" read -- windrow --; column 2, line 21, before the word "schematic" insert -- a --; column 10, line 4, for "bemder" read -- bender --; line 13, for "alined" read -- aligned --.

Signed and sealed this 3rd day of June 1958.

(SEAL)
Attest:

KARL H. AXLINE
Attesting Officer

ROBERT C. WATSON
Commissioner of Patents